United States Patent [19]

Ryan

[11] 3,756,665
[45] Sept. 4, 1973

[54] CONTROL APPARATUS FOR APPLICATION OF AUTOMATIC AIR BRAKE SYSTEMS
[75] Inventor: Paul T. Ryan, Erie, Pa.
[73] Assignee: General Electric Company, Erie, Pa.
[22] Filed: July 7, 1972
[21] Appl. No.: 269,798

[52] U.S. Cl..................................... 303/81, 303/18
[51] Int. Cl............................................ B60t 15/20
[58] Field of Search............... 303/18, 32, 70, 80–83, 303/23 R, 30

[56] References Cited
UNITED STATES PATENTS
1,855,597  4/1932  Bushnell ............................. 303/18
1,878,993  9/1932  Anderberg et al................. 303/23 R
2,258,783  10/1941 McNeal ............................. 303/81 X Primary Examiner—Duane A. Reger
Attorney—Walter C. Bernkopf

[57] ABSTRACT

A system for remotely controlling in discrete increments the application of pneumatic braking force in an automatic air brake system of a train, to precisely control the amount of braking force applied for a given train length. A plurality of vessels with associated electrically controlled valves is provided to progressively reduce the pressure in a pilot reservoir by expanding the volume of a communicating network, the degree of expansion in volume being determined by the combination of vessels sequentially added in parallel to the reservoir by control of the associated electrically controlled valves. Brakes are applied by removing electrical energy, whereby loss of power or failure of a circuit will automatically increase braking to an emergency level.

11 Claims, 5 Drawing Figures

| DEGREE OF BRAKEAGE | MAGNET VALVES | | | |
|---|---|---|---|---|
| | 37 | 44 | 46 | 47 |
| RELEASED | ▲ | ▼ | ▲ | ▲ |
| STEP 1 | ▼ | ▲ | ▲ | ▲ |
| STEP 2 | ▼ | ▲ | ▼ | ▲ |
| STEP 3 | ▼ | ▲ | ▼ | ▼ |
| RELEASED | ▲ | ▼ | ▲ | ▲ |
| (▲ = ENERGIZED; ▼ = DE-ENERGIZED) | | | | |

CONTROL APPARATUS FOR APPLICATION OF AUTOMATIC AIR BRAKE SYSTEMS

BACKGROUND OF THE INVENTION

This invention relates generally to pneumatic brake systems and more particularly to automatic, air brake systems for remote controlled railroad trains.

A commonly known scheme in air brake systems provides for automatic application of brakes upon the reduction of pressure in a charged brake pipe extending the length of the train. The advantages of such a system, wherein the braking force is inversely proportional to the brake pipe pressure, is that a fault in the system as for example, a burst air hose, will automatically cause the brakes to be applied, thus always ensuring a safe condition of operation with regard to the integrity of the overall brakeage system. This is accomplished by providing at each car an auxiliary reservoir selectively communicating through a valve with the brake pipe or the brake cylinders on the car. The reservoir is charged to a constant pressure when communicating with the brake pipe under released brake conditions, and is discharged to activate the brakes by communication with a release of pressure to the brake cylinders.

Reduction of brake pipe pressure with consequent application of the train brakes is occasioned by the engineer's opening of a brake valve to exhaust air from the brake pipe to the atmosphere. In order to eliminate the need for the engineer to leave the valve open for a long period of time, the time being dependent on the train length, an equalizing reservoir and associated discharge valve are provided. The discharge valve maintains the air pressure in the brake pipe at a level corresponding to that of the equalizing reservoir. The desired level of brakeage can then be applied by selective control of the brake valve to directly regulate the pressure in the equalizing reservoir, irrespective of the train length. When the brake valve is set so that the brakes are released the equalizing reservoir is fully charged from the compressor to a pressure corresponding to that in the brake pipe and auxiliary reservoir, whereas, when it is set to effect maximum braking, the equalizing reservoir is caused to exhaust completely to atmospheric pressure the time of exhaustion being always the same and not dependent on train length. Any intermediate brakeage levels desired are set by proper regulation of the time duration in which the brake valve is left open.

Various schemes have been used to control braking in this manner. In automated systems the brakes are commonly set by means of control signals which are time modulated, thus again requiring the operator to consciously, or at least instinctively, apply the signals for a specific period of time to obtain a given braking effort. The greatest disadvantage of such an arrangement is the attention that must be given by the operator. Even if he is skilled with respect to brakeage levels and corresponding required time periods of application, he must still remain attentive during the period between the application and release or lapping (wherein the equalizing reservoir is neither discharged nor charged) of the controls.

As for completely automated systems, wherein a train automatically receives signals to bring about propulsion or braking as a function of conditions, such as train length, load, and grade, it is desirable to provide for a plurality of sequential steps in the level of braking effort. The use of a plurality of pressure switches, selective activation of which would allow specific levels of pressure and brakeage to be applied, is a possible means. These pressure switches are potentially troublesome with respect to operation and maintenance and are considered less desirable for use in such a system wherein safety is considered to be of prime importance.

The use of electrical or pneumatic devices to control brakeage, carries with it the possibility of a malfunction in the system. If that should occur, it is desirable to bring about a corresponding application of brakes, rather than a loss of all braking capability. Various switching arrangements now in use do not provide for this important feature.

It is therefore an object of this invention to provide an automatic air brake system which requires a minimum of attention from the operator.

Another object of this invention is the provision in an automatic air brake system for a plurality of levels of brakeage to be available for application.

Yet another object of this invention is the provision therein for rapidly applying a desired brakeage level without need for time modulation of control equipment.

Still another object of this invention is the provision for an automatic brake system which permits discrete stepped reduction of air pressure by means of signal pulses whose time duration does not have to be modulated.

A further object of this invention is the provision for an automatic air brake system which automatically applies an appropriate degree of brakeage when a malfunction occurs in the system.

Yet another object of this invention is the provision in an automatic air brake system for control apparatus which is economical to construct, simple in operation and reliable in use.

These objects and other features and advantages become more readily apparent upon reference to the following description wherein taken in conjunction with the appended drawings.

SUMMARY OF THE INVENTION

The subject invention provides for a systematic reduction of pressure in discrete increments, to precisely control the amount of braking force that is applied throughout the train. A plurality of vessels of predetermined volume are adapted to be connected in parallel and communicate with the pilot reservoir (equalizing reservoir), by actuation of associated valves. Access of the pilot reservoir to each of the vessels is controlled by a magnet valve, with the valves being independently activated in a predetermined sequence to expand the volume, decrease the pressure in the brake pipe, and actuate the brakes to the degree desired. Such a system lends itself to automated control using an electrical signal to selectively open or close the valves, thereby providing for a rapid and precise application of the brakes without need for time modulation or guesswork by the operator. The magnet valve arrangement is such that the brakes are applied by opening circuits or removing electrical energy, so that loss of power or a break in the circuitry will automatically increase the braking effort to an extent that offsets any loss of capabilities that could occur by such a malfunction.

In the drawings as hereinafter described a preferred embodiment is depicted; however, various other modifications alternate constructions can be made thereto without departing from the true spirit and scope of the invention.

DESCRIPTION OF THE PREFERRED EMBODIMENT

Figure 1:
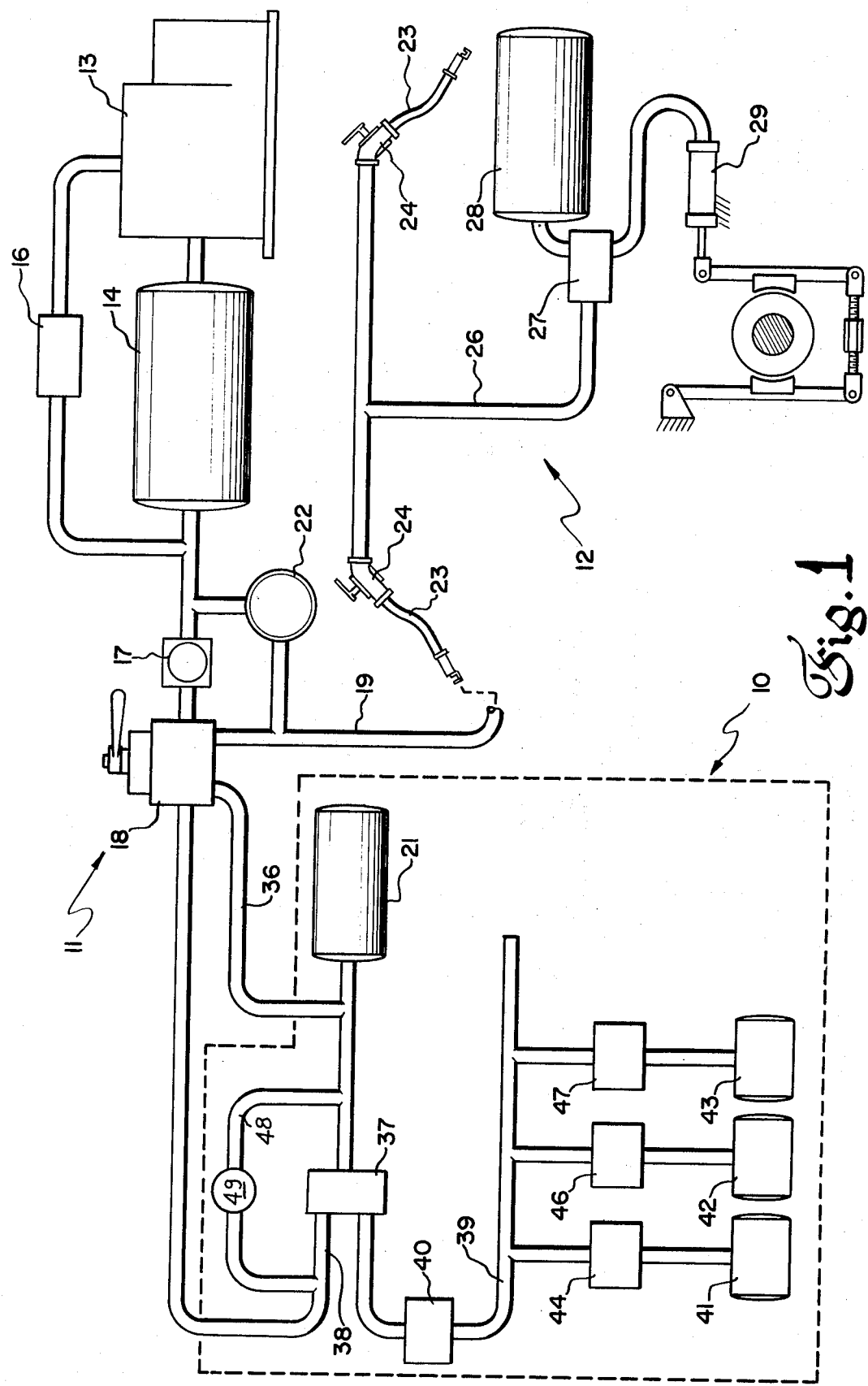
FIG. 1 is a diagramatical illustration of a pneumatic brake system in accordance with the preferred embodiment of this invention.

Reference is now made to FIG. 1 wherein an automatic air brake system, of the type commonly used on railway trains, is shown as modified by the preferred embodiment of this invention.

Briefly, the invention portion 10 comprises a part of the apparatus 11 which is located aboard the locomotive (not shown) and is used to control the application of brakes to each of a plurality of railway cars having individual car brake assemblies 12.

An air compressor 13 driven by a prime mover such as an electric motor (not shown) supplies air to a main reservoir 14 and maintains a substantially constant pressure therein by way of a compressor governor 16. The governor is commonly an air-pressure controlled switch which closes at a cut-in pressure and opens at a cut-out pressure. Typically, a pressure of 85–100 psi is maintained in the main reservoir, and a pressure reducing valve 17 is inserted between the reservoir and the brake valve 18 to provide a lower constant pressure to the brake valve 18.

Independently communicating with the brake valve 18 is a brake pipe 19 and an equalizing reservoir 21. The brake valve 18 is a valve which functions to develop or dissipate pressure in the equalizing reservoir 21 in proportion to the degree of movement on the handle quadrant of the brake valve 18. In turn, pressure in the brake pipe is developed and exhausted by a relay valve that is piloted by the equalizing reservoir pressure, maintaining the same pressure condition in the brake pipe 19 that exists in the equalizing reservoir 21. A duplex air gauge 22 provides an indication of the pressure in both the main reservoir and the brake pipe.

The brake pipe 19 extends the length of the train, with sections of hose 23 interconnecting the individual cars. Cocks 24 are disposed on each end of the cars to close off the brake pipe when desired.

Individual car brake assemblies 12 communicate with the brake pipe through a branch pipe 26 and comprise a triple valve 27 operably connected to an auxiliary reservoir 28, a brake cylinder 29 and the branch pipe. Such an assembly is adapted for use in "automatic" air brake systems wherein the train brakes are automatically applied when a fault occurs in the pneumatic circuit, as for example when the hose connections between cars are broken. A reduction in brake pipe air pressure causes an application of the brakes, while a charging with air tends to release them. In operation, the brake pipe is charged by a setting of the brake valve 18 on the locomotive. The pressure in the branch pipe 26 operates the triple valve 27 which connects the brake cylinder 29 to an exhaust port to release the car brake, and the auxiliary reservoir 28 to the brake pipe 19 to be chargecd to a like pressure. Application of the brakes is made when the brake valve 18 is positioned to exhaust air from the brake pipe (in the "service" position). Falling pressure causes the triple valve 27 to operate this time to disconnect the auxiliary reservoir 28 from the brake pipe 19, close off the brake cylinder exhaust port, and connect the auxiliary reservoir 28 to the brake cylinder 29. As long as the brake pipe 19 pressure is falling, the auxiliary reservoir 28 is connected to the brake cylinder 29. Its air, typically at an original pressure of at least 70 psi, flows into the brake cylinder 29, forces the piston out, and applies the brake. As the pressure in the brake pipe 19 and auxiliary reservoir 28 falls, the brake cylinder pressure rises, eventually to an equal value if application is continued. Typically, on a system wherein the auxiliary reservoir 28 is charged to 70 psi, to make a full service application of the automatic brake, it is only necessary to reduce the brake pipe pressure from 70 psi to 50 psi, thus causing a pressure of 50 psi to be applied to the brake cylinders 29.

If the brake pipe pressure reduction is stopped in the range between the fully charged condition and the equalization point where brake pipe, auxiliary reservoir, and brake cylinder pressure are all equal, the triple valve 27 operates to set-up a "lap" position wherein the brake cylinder 29 is disconnected from the auxiliary reservoir 28, but is not connected to exhaust, thus leaving the brakes partly applied in trains employing direct release type car brakes. The triple valve 27 will only "lap" on falling brake pipe pressure of an application, not on rising pressure of a release. As a consequence, a partial release cannot be made. That is, raising the brake pipe pressure will cause a full release. Brakes can be reapplied without recharging, but only to the level provided by the remaining air in the car reservoirs. If the car reservoirs are down to 50 psi, the brake pipe must be lowered below 50 to reapply brakes. By carrying brake pipe pressure at say 110 psi, several applications are possible in quick succession. However, there are other disadvantages that result from carrying these higher pressures.

Figure 2:
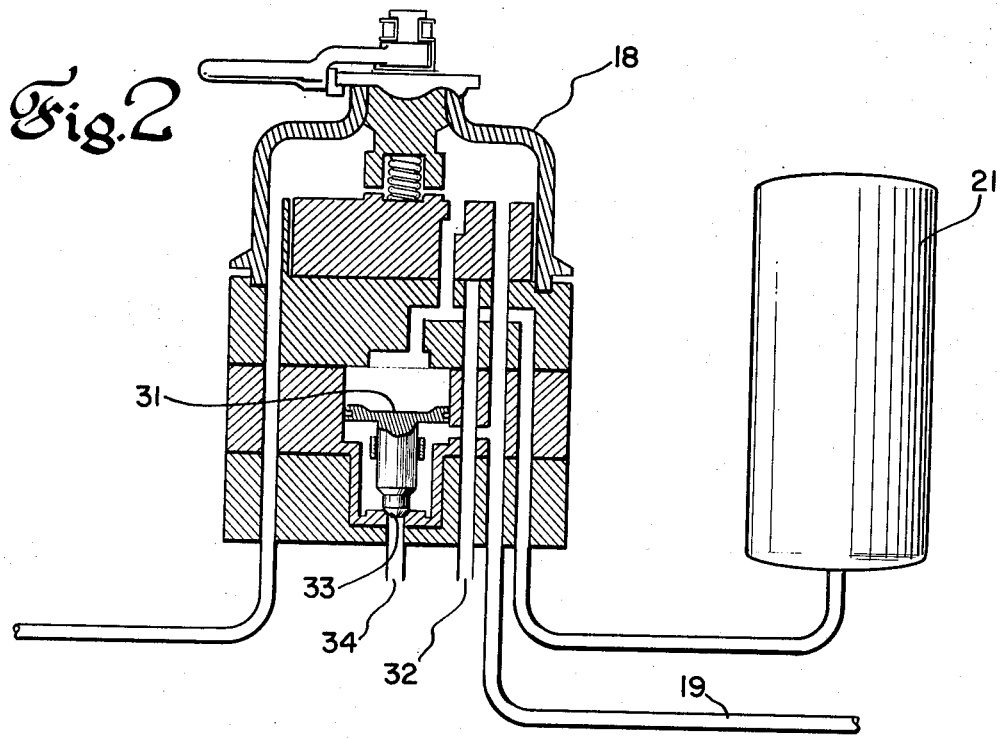
FIG. 2 is a diagram of the brake valve portion thereof when in the released brake condition.
Figure 3:
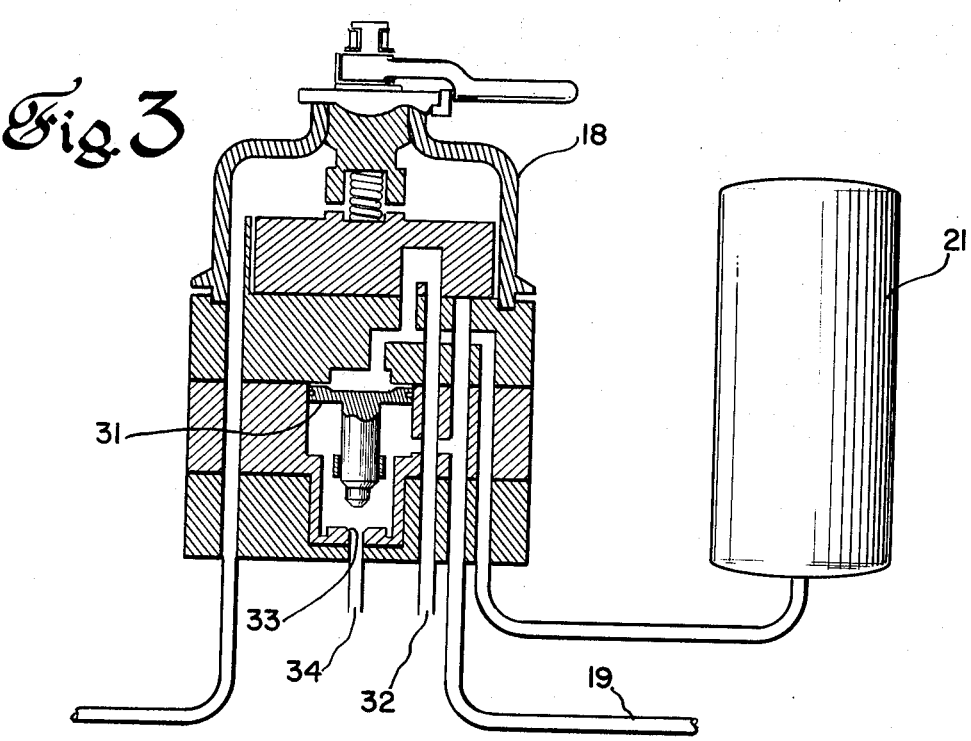
FIG. 3 is a diagram thereof when in the applied brake condition.

Without the equalizing reservoir 21 it would be necessary when applying the brakes, to leave the brake valve 18 in the "service" position until the brake pipe 19 has been exhausted to the desired pressure. In a long train the time would be significant, and the engineer would have to closely watch the brake pipe gauge to know when his reduction was made. Provision was thus made, to use as a pilot, an equalizing reservoir 21, communicating with the brake valve 18 as shown in FIGS. 2 and 3. To facilitate the arrangement an equalizing piston 31 (a relay valve) is used to equalize the pressure in the equalizing reservoir 21 with that in the brake pipe 19. The former is connected to the top side of thep piston and the latter to the underside thereof. The equalizing piston 31 is adapted to operably move up or down in response to the pressure difference between the equalizing reservoir 21 and the brake pipe 19, with its position controlling the exhaust of air from the brake pipe, and consequent decreases in pressure therein.

Referring to FIG. 2, the brake valve 18 is shown in a released position, wherein the brake pipe and equalizing reservoir are being charged to an equal pressure. The equalizing piston 31 then remains in the down position as shown, and air from the main reservoir flows to the brake pipe and reservoir as indicated by the arrows. Each time that the brakes are applied and then released it is necessary to recharge the system in this manner. A valve (not shown) provides for periodic recharging necessitated by brake line leakage to pressures below the fully charged condition.

When the brake valve 18 is placed in the "service" condition, the equalizing reservoir commences to exhaust through the port 32 of FIG. 3. The resultant reduced pressure at the top of the piston 31 causes it to be pushed up by the higher brake pipe pressure. This opens a discharge valve 33 on the lower end of the piston 31, thereby connecting the brake pipe to a separate exhaust port 34 as shown by the arrows in FIG. 3. Brake pipe pressure is thus reduced and the brakes applied to a corresponding extent. If the brake valve is left in the "service" position, the reservoir pressure will be reduced to a minimum and the brake will be applied to the fullest extent. In a system without an equalizing reservoir, the time for which it would be necessary to leave the valve in the "service" position would be great, depending on the length of the train, whereas with an equalizing reservoir, the time required to reduce this pilot pressure to a given point is constant. The time to exhaust the brake pipe will not be affected, but the equalizing reservoir allows an operator to more quickly arrive at a degree of brake setting and then take action to limit it to that degree.

Limiting the brakeage level is accomplished by moving the brake valve to a "lap" position, wherein the equalizing reservoir is neither discharged nor charged and remains at the pressure to which it was reduced. As long as the brake pipe pressure on the underside of the equalizing piston is greater than the equalizing reservoir pressure, the piston is up and the brake pipe is connected to exhaust to atmosphere. As soon as the pressures are equalized the piston 31 moves down, closing the discharge valve 33 and lapping off the brake pipe from the atmosphere. The time it takes for the equalizing piston to drop depends on the train length, but the time that it takes to set the desired degree of braking (i.e., the time that the brake valve must remain in the "service" position before being moved to the "lap" position) is the same for a given degree of braking.

As mentioned hereinabove, an inherent characteristic of the direct release type of car equipment is that once the brakes have been applied and released they cannot be reapplied until the brake pipe and auxiliary reservoir have been fully recharged, which may involve a considerable time period. Consequently, since a release of the brakes can't be graduated, it is imperative that they are not over-applied. If they are, it would be necessary to either leave them at that level, or fully release them, recharge the system and reapply them to a lesser degree. Such a situation may arise if the operator is distracted or forgets during the time the valve is in the "service" position.

It is therefore advantageous to provide for a plurality of predetermined and discrete levels of braking to be applied by control of the additional pneumatic network 10 shown in FIG. 1.

An equalizing reservoir pipe 36 extends between the reservoir 21 and an exhaust valve 37, which selectively establishes communication with either a charging pipe 38 or an expansion manifold 39. The exhaust valve is preferably of the magnetic type which lends itself to remote control operation.

Air flows along the charging pipe 38 from the brake valve 18 to the equalizing reservoir during periods when the exhaust valve 37 is in the "released" position, and the system operates as described hereinabove, with the equalizing reservoir pipe 36 leading to the upper side of the equalizing piston. During periods wherein the exhaust valve 37 is in the "application" position, air flow from the charging pipe 38 is shut off and air is exhausted from the reservoir 21 through the pipe 36 to the expansion manifold 39. Connected in parallel to the expansion manifold 39 is a plurality of vessels 41, 42, and 43 of predetermined constant volumes. Access to the vessels 42, 43, and 44 from the expansion manifold 39 is controlled by independently operating control valves 44, 46 and 47 respectively preferably of the magnetically activated type. By selective actuation of these valves, the accessible volume, into which the equalizing reservoir can be exhausted, is expanded, and hence the pressure therein is reduced to a corresponding degree to cause application of the brakes. A choke 40 may be installed in the manifold 39 to limit the rate at which air pressure decreases.

Specific design characteristics of the system may be met by proper selection of the number and respective sizes of the vessels utilized. For example, in a system having a 220 cu. in. reservoir it may be desirable to have available discrete braking steps occasioned by progressive brake pipe pressure reductions of 6, 13, and 20 lbs. Accordingly, the number of constant volume vessels required would be three, with volumes of 20, 30, and 38 cu. in. adapted to be successively utilized in that order. Any number of vessels may be utilized to obtain as many discrete braking steps. One has only to set the desired brakeage level by the proper selection of magnet valves to be activated, and no time modulation is required to arrive at that desired level.

Figures 4, 5:
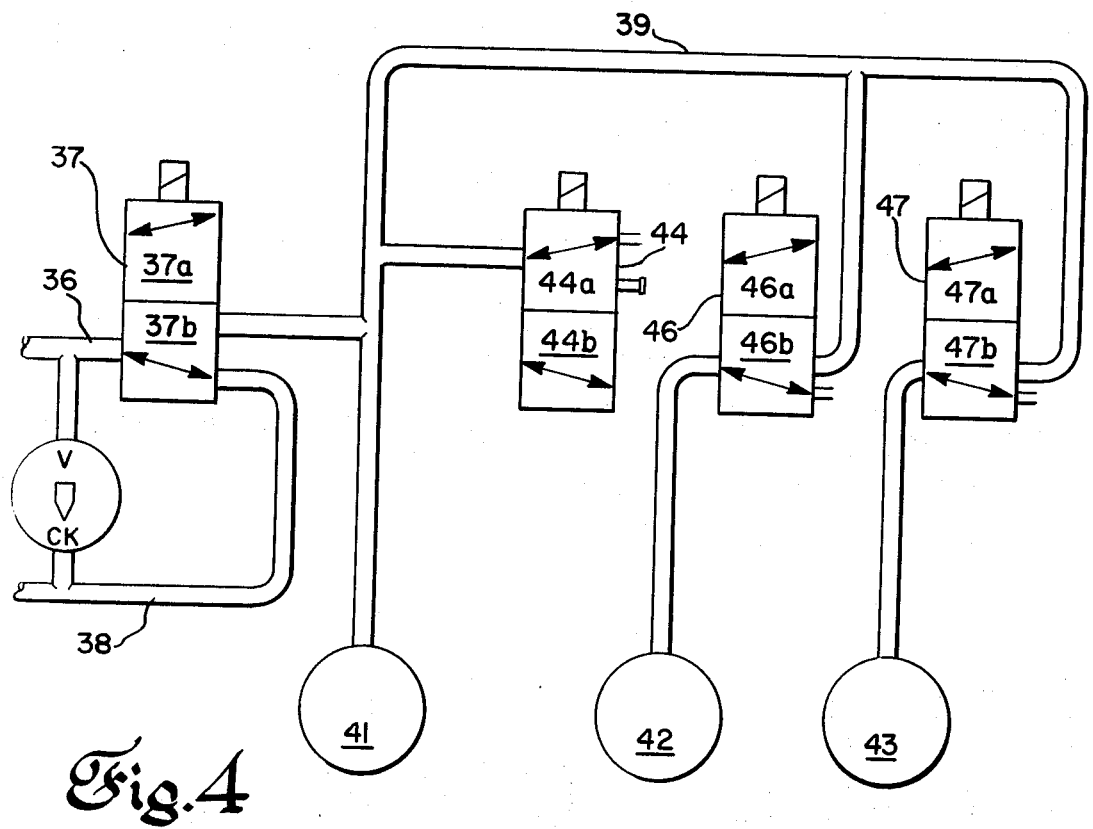
FIG. 4 is a schematic illustration of the controlled expansion portion of the invention.
FIG. 5 is a tabular representation of magnet valve actuation condition with respect to brakeage level condition.

The system may be made to operate in a manual mode, wherein the operator leaves brake valve 18 in the "released" position and makes the proper selection and settings of the valves 37, 44, 46 and 47. However, the trend is toward automation, and the subject system lends itself to remote control, since a simple electrical signal may be used to operate the magnet valves. FIG. 4 is a schematic illustration of the valve portion of a system which is adapted for use in an automated system. Use if made of magnet valves of the conventional type, wherein a spring biased plunger is moved by the energization of a solenoid. It is contemplated that such a system would be automatically controlled by electrical signals generated in response to change in the railway profile. Other factors, such as train length, load weights, desired speeds, and anticipated stopping points, would of course be relevant to programming the brake control functions.

As is schematically shown in FIG. 4, the magnet valves 37, 44, 46, and 47 each have an upper and a lower part, $a$ and $b$ respectively, and are operable to be functional in either of the two positions by vertical movement thereof. The positions shown are those appropriate for a released brake condition, with parts 37b, 44a, 46b, and 47b being in the functional condition. The master magnet valve 37 is in the actuated position to direct the air flow from the charging pipe 38, to the equalizing reservoir pipe 36, for a charging of the reservoir. The remaining magnet valves 44, 46, and 47 are positioned so as to exhaust the vessels 41, 42, and 43, respectively to the atmosphere.

It should be noted that while operating in an automated mode, with movement of the valves being remotely controlled, the brake valve 18 is set in the "released" position and left there, since its function is now effected by the magnet valves. As a safety measure, provision is made for a bypass pipe 48 having a check valve 49 inserted therein, to bypass the exhaust valve 37. Without this check valve 49, once the exhaust valve 37 is de-energized movement of the brake valve 18 would have no effect. With its installation there is provided a manual override which may be used to increase the brakeage by exhausting the equalizing reservoir through the brake valve.

Also of note is the actuation scheme of the magnet valves, whereby the brakes are applied by opening circuits or removing electrical energy, thus causing increased braking rather than loss thereof in the event that a loss of power or brakeage of a wire occurs. Illustrated in FIG. 5 is a table in which is indicated for each degree of brake setting the actuation condition of each of the magnet valves. In the event that any one of the valves fails to actuate as desired, brakeage will be effected to a degree equal to or greater than that desired.

When in the brake-released condition as shown in FIG. 4, the magnet valves 37, 46, and 47 are actuated while magnet valve 44 is not. Malfunction of valves 46 and 47 will not effect the system in this condition, but malfunction of valve 37 will cause air to be exhausted to the atmosphere through port 44a.

A first brakeage step is occasioned by de-energizing exhaust valve 37 and energizing valve 44, thus bringing into use the ports 37a and 44b. The exhaust manifold 39, is then charged and vessel 41 receives a given volume of air (e.g., 20 cu. in.) to reduce the pressure in the reservoir, and hence in the brake pipe by a given value (e.g., 6 psi.). Again, if magnet valve 44 fails to actuate, air will be exhausted to the atmosphere through port 44a and a greater degree of braking will be initiated.

If further braking is desired magnet valve 46 is de-energized and vessel 42 is available for expansion of air from the manifold 39 through the port 46a. Air pressure in the reservoir 21 is decreased a corresponding amount and the degree of brakeage is increased accordingly. Similarly, if still further braking is desired magnet valve 47 is de-energized and a third degree of brakeage is effected. It is important to note that the last two steps are initiated by de-energization of the magnet valves rather than the energization thereof. Power losses will then cause over-reaction of the system rather than the opposite. Release of the brakes is then accomplished by returning the valves to the initial position with valves 37, 46, and 47 in an actuated condition and valve 44 is a de-actuated condition.

What I claim as new and desire to secure by Letters Patent of the United States is:

1. An improved pneumatic brake system of the type having a source of compressed air, means for charging to predetermined pressures from the source, both an equalizing reservoir and a brake pipe, equalizing valve means sensitive to the pressure difference between the brake pipe and the equalizing reservoir to exhaust the former to pressure equal to that in the latter, exhaust valve means for selectively exhausting the reservoir to predetermined pressures, and a plurality of brake cylinders operably communicating with the brake pipe to apply brakes in response to pressure reduction therein, wherein the improvement comprises:
   a. an exhaust manifold selectively communicating with the equalizing reservoir through the exhaust valve;
   b. a plurality of constant volume vessels adapted to be connected in parallel to said exhaust manifold;
   c. control valve means for discretely connecting said vessels to said exhaust manifold in various selected combinations so as to decrease the pressure therein by an amount related to the combined vessel volume, thereby providing a plurality of selected degrees of braking effort to be applied in the system.

2. A pneumatic brake system as set forth in claim 1 and including vessel exhaust valve means for selectively exhausting each of said plurality of constant volume vessels to the atmosphere.

3. A pneumatic brake system as set forth in claim 2 wherein said vessel exhaust valve means is integral with said control valve means and comprises a plurality of independently activated duplex valves operable in one position to exhaust their associated vessel, and in the other position to establish communication between said vessel and said exhaust manifold.

4. A pneumatic brake system as set forth in claim 3 wherein each of said plurality of duplex valves is electrically energized, and further wherein, in its energized condition, it terminates communication from the exhaust manifold to its associated vessel and said vessel is exhausted to the atmosphere, whereas in its de-energized condition it establishes communication between its associated vessel and said exhaust manifold.

5. A pneumatic brake system as set forth in claim 1 and including at least one constant volume vessel connected directly to said exhaust manifold so as to communicate directly therewith.

6. A pneumatic brake system as set forth in claim 5 and including a duplex valve connected to said exhaust manifold in parallel with said at least one constant volume vessel, said duplex valve being operable in one position to exhaust said exhaust manifold to the atmosphere, and in the other position to close-off such exhaust.

7. A pneumatic brake system as set forth in claim 6 wherein said duplex valve is electrically energized and further wherein, in its de-energized condition it exhausts said exhaust manifold, whereas in its energized condition it closes off such exhaust.

8. A pneumatic brake system as set forth in claim 1 wherein said exhaust valve means is integral with said equalizing reservoir charging means.

9. A pneumatic brake system as set forth in claim 8 wherein said exhaust valve means comprises a duplex valve operable in one position to connect the source of compressed air to the equalizing reservoir for the charging thereof, and in the other position to disconnect the source of compressed air and connect the exhaust manifold to the equalizing reservoir for the exhaustion thereof.

10. A pneumatic brake system as set forth in claim 9 wherein said exhaust valve is electrically energized, and further wherein the energization thereof causes a charging of the equalizing reservoir, whereas the de-energization thereof causes exhaustion of the equalizing reservoir.

11. A pneumatic brake system as set forth in claim 10 and including a bypass in parallel with the exhaust valve said bypass having a check valve therein and providing fluid communication from the equalizing reservoir to the source of compressed air, thereby providing a means of exhausting the equalizing reservoir by proper manipulation of the charging means.

* * * * *